United States Patent [19]

Johnston et al.

[11] 3,895,153

[45] July 15, 1975

[54] FRICTION-SURFACE SHEET

[75] Inventors: Manley R. Johnston, St. Paul; Roger P. Goeppinger, N. St. Paul, both of Minn.

[73] Assignee: Minnesota Mining and Manufacturing Company, St. Paul, Minn.

[22] Filed: Oct. 5, 1973

[21] Appl. No.: 403,827

[52] U.S. Cl. .............. 428/141; 156/209; 156/220; 264/284; 428/493; 428/494
[51] Int. Cl. .............................................. B32b 3/26
[58] Field of Search ........... 161/116, 231, 252, 253, 161/256, DIG. 3, 255; 117/8, 10; 264/284; 156/209, 220

[56] References Cited
UNITED STATES PATENTS

| | | | |
|---|---|---|---|
| 3,030,251 | 4/1962 | Bore et al. .......................... | 161/116 |
| 3,484,835 | 12/1969 | Trounstine et al. ................. | 264/284 |
| 3,616,191 | 10/1971 | Fuerholzer et al. ................ | 161/252 |

*Primary Examiner*—George F. Lesmes
*Assistant Examiner*—Stanley S. Silverman
*Attorney, Agent, or Firm*—Alexander, Sell, Steldt and DeLaHunt

[57] ABSTRACT

A flat, backing layer of uniform thickness of biaxially oriented, heat set polyethylene terephthalate having adherently bonded to its upper surface a textured, tough, scuff-resistant, weather-resistant layer of certain thermoplastic ethylenic copolymers, and a normally tacky pressure-sensitive adhesive layer adherently bonded to its lower surface, provides a friction-surface sheet for use on stairs, in bath tubs and showers, and on other surfaces which may be inherently undesirably slippery. The friction-surface sheet is made by coating a thin, ultra-violet light transmissive self-sustaining layer of a coherent film forming thermoplastic polymer onto the polyethylene terephthalate layer, irradiating the interface between the layers to cause adherent bonding, coating the ethylenic copolymer on top of the polymer layer by melt fusion, and embossing the copolymer layer to provide the textured surface. Pressure-sensitive adhesive is then applied to the lower surface of the sheet to facilitate mounting thereof on any of a variety of substrates.

6 Claims, 6 Drawing Figures

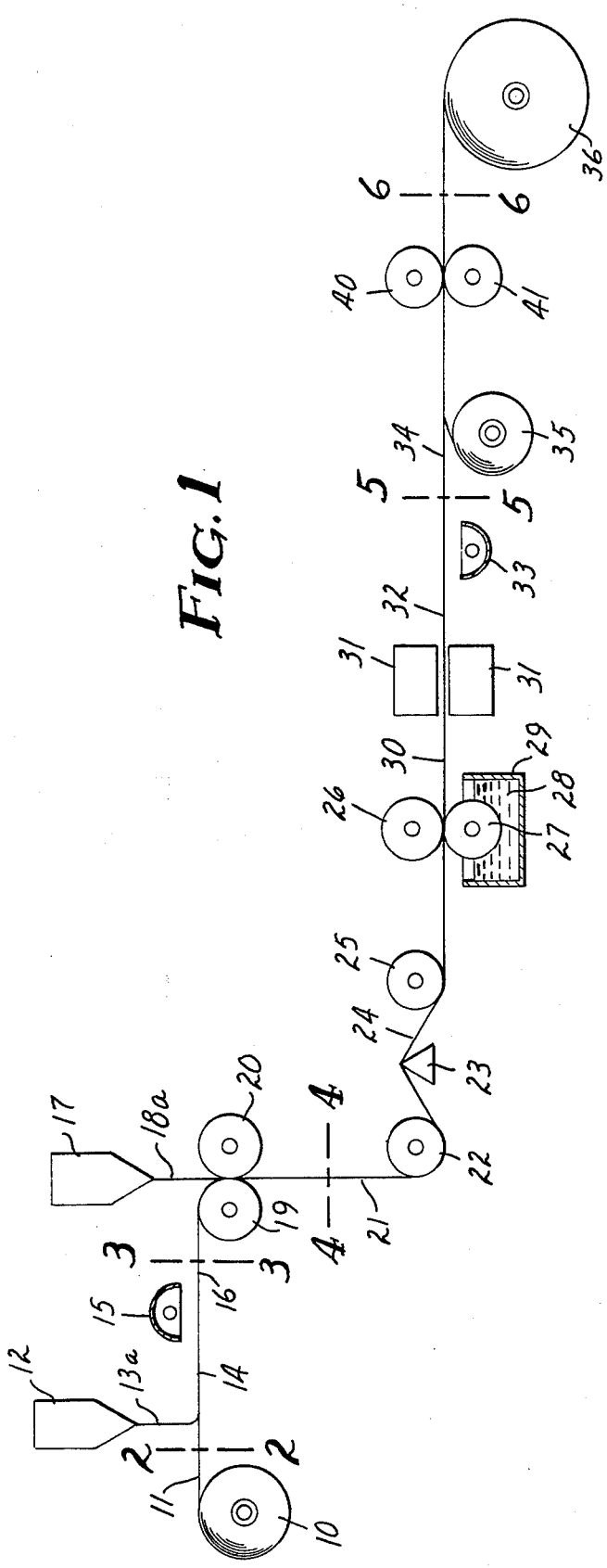
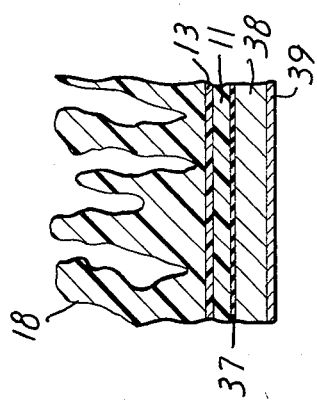
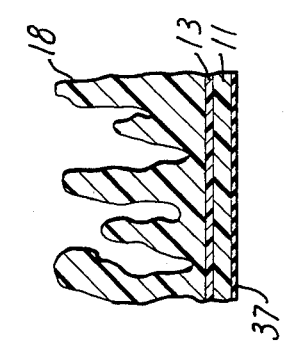

FRICTION-SURFACE SHEET

BACKGROUND OF THE INVENTION

This invention relates to friction-surface sheet material.

Typically, present friction-surface or non-skid sheet materials are made by adhering granules to resin-impregnated fabric backing or plastic film by means of adhesive which is usually pigmented and overcoats the granules to provide a pleasing surface, both esthetically and underfoot. Examples of such products may be seen in U.S. Pat. Nos. Re.25,788, 3,030,251, 3,578,550, 3,030,223 and British Pat. No. 971,741. While such products have seen considerable commercial success, they have certain inadequacies which the present invention eliminates.

Since these prior art sheet materials are all formed by depositing granules on a backing sheet and overcoating the granules with adhesive, the resultant product is inherently subject to the formation of air pockets among the adhesive covered granules. Such air pockets will rupture, providing sites for bacteria to accumulate and flourish, staining the sheet and creating a health hazard. Additionally, while seemingly simple to produce, the friction-surface sheet material containing granules requires extremely careful coating conditions and particle size control, else a non-uniform surface product will be produced. Furthermore, while these prior art granule-containing sheets at first appear attractive, they may lose their attractive uniform surface as their upper surface of pigmented adhesive is abraded away during use, exposing the granules contained within, which are usually not the same color.

While, at first appearance, an easy solution to the inadequacies discussed above would seem to be to simply emboss a thermoplastic sheet to impart a friction surface, attempts to produce such a sheet have yielded inferior products. Embossing an unsupported layer of a tough scuff-resistant thermoplastic resin, however, results in a product which lacks dimensional stability and easily distorts in use. Laminating a layer of embossable thermoplastic resin to a dimensionally stable backing such as heat-set, biaxially oriented polyethylene terephthalate is difficult because of the latter's non-adherent surface, which virtually defies permanent adhesion thereto by resins having the desired properties for the embossed layer. Products have been made by interposing a normally tacky and pressure-sensitive adhesive layer between the backing layer and the embossed upper layer, but these are expensive to make and eventually delaminate in use or upon subsequent removal from a substrate after use, leaving a difficult to remove residue.

Despite the fact that friction-surface sheets have been known for more than a decade, no adequate solution has been provided for the inadequacies set forth above, prior to the present invention.

SUMMARY

The present invention provides a friction-surface sheet which can be rapidly and economically produced in large quantities, without the use of granules and without the special coating techniques associated therewith. The sheet has the desired frictional characteristic, dimensional stability, abrasion resistance, moisture resistance, tear resistance, and crack resistance for the use described herein, combined with adequate elongation, stretchability, and deformability to provide a long-lasting, effective, frictional surface sheet under virtually all climatic conditions.

The friction-surface sheet of the invention is comprised of a flat layer of biaxially oriented, heat-set polyethylene terephthalate of uniform thickness and having adherently bonded to its upper surface an embossed, textured, tough, scuff-resistant, weather-resistant layer of certain thermoplastic ethylenic copolymers, and a pressure-sensitive adhesive layer adherently bonded to its lower surface.

The friction-surface sheet can be made by coating a thin, ultra-violet light transmissive, self-sustaining, coherent layer of film-forming thermoplastic polymer onto the polyethylene terephthalate layer, irradiating the layer interface with ultra-violet light for a time and at an intensity sufficient to create an adherent bond between the layers, coating molten ethylenic copolymer on top of the polymer layer to provide an embossable layer, and embossing the copolymer layer to impart the desired textured surface. Other ways of obtaining this laminated structure will also be disclosed. Normally tacky and pressure-sensitive adhesive is applied to the lower surface of the sheet thus described to facilitate mounting thereof to any of a variety of substrates.

BRIEF DESCRIPTION OF THE DRAWING

Understanding of the invention will be facilitated by referring to the accompanying drawing, wherein:

FIG. 1 is a schematic representation of the presently preferred method of preparing the friction-surface sheet of the invention;

FIG. 2 is a cross sectional view taken at line 2—2 of FIG. 1;

FIG. 3 is a cross sectional view taken at line 3—3 of FIG. 1;

FIG. 4 is a cross sectional view taken at line 4—4 of FIG. 1;

FIG. 5 is a cross sectional view taken at line 5—5 of FIG. 1; and

FIG. 6 is a cross sectional view showing the friction-surface sheet of the invention and is taken at line 6—6 of FIG. 1.

In accordance with the invention and as depicted in FIGS. 2–6, flat, biaxially oriented, heat-set polyethylene terephthalate film 11 of substantially uniform thickness is adherently bonded to thermoplastic polymer layer 13 which is adherently bonded to embossed layer 18 formed of a tough, flexible, scuff-resistant, weather-resistant, thermoplastic ethylenic copolymer. The opposite surface of polyethylene terephthalate film 11 is adherently bonded to normally tacky and pressure-sensitive adhesive layer 38 which may be protected prior to use by a suitable release liner 39. A prime coating 37 of rubber may be desired when rubber-base adhesive compositions are used as the pressure-sensitive layer.

PRESENTLY PREFERRED EMBODIMENT

As shown in FIG. 1, the friction-surface sheet material is prepared by first coating biaxially oriented heat-set polyethylene terephthalate film 11 obtained from supply roll 10. An ultra-violet light transmissive self-sustaining, coherent layer of thermoplastic polymer primer is extruded as a molten sheet 13a from extruder 12 onto the upper surface of film 11 to provide coated film 14. Coated film 14 is irradiated by ultra-violet light source 15 through the coating at an intensity and for a time sufficient to cause adherent bonding between the coating and the polyethylene terephthalate film to produce primed laminate 16. (Further description of ultraviolet light coating techniques may be found in U.S. Pat. No. 3,188,266, incorporated herein by reference.) Molten copolymer as sheet 18a is extruded from extruder 17 onto the primed surface as the freshly coated composite film is simultaneously passed between embossing roll 20 and backup roll 19 to produce embossed film 21. After hardening, film 21 is passed under tension over decurling edge 23 between idler rolls 22 and 25 to make the textured surface convex. Decurled laminate 24 is then primed on its lower surface by roll coating a rubber/solvent priming solution 28 contained in vessel 29 with coater roll 27 which operates in opposition to backup roll 26. Rubber-coated composite film 30 is then dried of solvent at drying station 31 by use of either a circulating air source, oven, hot can dryer, or a combination thereof, providing rubber coated laminate 32. Laminate 32 is exposed to a second ultraviolet light source 33 through the rubber coat and irradiated therewith to cause a permanent adherent bond between the rubber layer and the polyethylene terephthalate film surface, providing composite film 34. Pressure-sensitive adhesive, as a self-supporting film (carried on a suitable release liner to prevent blocking) is then dispensed from roll 35 so that its exposed adhesive surface contacts the rubber-primed surface and this composite is passed between nip rolls 40 and 41 to consolidate the layers into an integral sheet which is wound as roll 36 for storage.

FIGS. 2-6 show the various stages of formation of the laminate formed by the process of FIG. 1. It is, of course, understood that the process may also be accomplished in individual steps wherein, after each process step which produces a handleable intermediate, the intermediate may be stored, and thereafter completed. For example, it may be desired to do some of the process steps at one location and others at another location.

Although the presently preferred embodiment specifies rubber-base normally tacky and pressure-sensitive adhesive applied over an initial prime coat, that is not the only type normally tacky adhesive which can be used. Other normally tacky and pressure-sensitive adhesives useful in the present invention will be exemplified and illustrated hereinafter.

Other ways of forming the friction-surface sheet material of the invention are possible and within the scope of the invention. For example, the polyethylene terephthalate and the copolymer layer may be coextruded to provide an integral composite film which can subsequently be biaxially oriented and heat-set. Additional copolymer is then coated on the composite's copolymer surface by melt fusion to provide the desired thickness for embossing as described above. Thereafter, adhesive is applied to the unembossed lower surface by the method disclosed above or by conventional adhesive coating techniques.

Coextrusion is a well known process wherein layers of thermoplastic materials are brought into contact while they are still molten. Formation and adhering of the layers takes place inside or immediately outside the extruding die, forming an integral composite. The composite film is thereafter endowed with improved physical properties by biaxial orientation and heat-setting.

Biaxial orientation, as is also well known, involves stretching the film in two directions normal to each other, generally in the machine direction and at right angles thereto. In a typical operation, the freshly formed molten composite film is fed onto a cooling drum to produce a quenched amorphous film, which is briefly heated and stretched in the machine direction, and then conducted through a tenter frame where it is stretched transversely with moderate heating. Machine direction stretching may be accomplished by passing between two sets of nip rolls the second set rotating at a higher speed than the first. Stretching typically increases the film area by a factor of at least six, the stretching usually being equal in each direction.

Heat-setting, or heat stabilization, of the stretched composite film is accomplished by restraining the film at its stretched dimension and heating briefly, then quenching. Such heating is typically in the range of 175°–240°C.

DETAILED DESCRIPTION

The backing sheet of the friction-surface sheet material of the invention is, as previously discussed, formed of biaxially oriented, heat-set polyethylene terephthalate. Such a material is well known and commercially available under the trade designations "Mylar" and "Scotch Par". This film is noted for its toughness, dimensional stability and inertness under a wide variety of conditions. For the invention, it has been found useful to use such film at thicknesses on the order of 1 to 5 mils. Film widths will vary depending upon the processing equipment, typically between 24 and 60 inches.

The priming polymer coated on the upper surface of the polyethylene terephthalate film is a film-forming thermoplastic capable of being formed into highly coherent, self-sustaining film which is transmissive to ultra-violet light, capable of forming an adherent bond with the polyethylene terephthalate film under the influence of ultra-violet irradiation, and capable of forming an adherent bond with the upper copolymer layer discussed hereinafter by melt fusion. The priming polymer layer should be thin enough to permit irradiation through its thickness, not contain ultra-violet light absorbing fillers, and be sufficiently coherent to resist cohesive failure when used as herein disclosed. Typically, the prime layer will be on the order of 0.5 to 3 mils thick. Suitable polymeric materials found useful for the prime layer include polymers of ethylene such as polyethylene and ethylene ethyl acrylate and ethylene vinyl acetate copolymers.

The upper, embossed layer is of an ethylene copolymer which is tough, scuff-resistant, moisture-resistant, weather-resistant, and flexible. This copolymer should also have a hardness value within the range of about 60–95 Shore A durometer (preferably 70–90), be resistant to permanent deformation at temperatures below about 90°C, have a dynamic coefficient of friction with respect to dry leather greater than 0.45 when embossed, have a tensile strength of at least 700 psi, and have an elongation of at least 100%.

The dynamic coefficient of friction of the embossed layer is determined by utilizing the procedure described in *Military Specification: Walkway Compound, Nonslip, and Walkway Matting, Nonslip* (MIL-W-5044C), dated Aug. 25, 1970. According to this publication, two pieces of vegetable-tanned cattlehide sole leather, ¼ by ½ inch by 10 inches are bonded to a 1 by 5 by 10.5 inch block of maple. Weights are added to provide a total weight of 20 pounds. The strips extend lengthwise symmetrically and about 4 inches apart of the 5 by 10.5 inch face of the block, with the flesh surfaces of the leather exposed. The exposed leather surfaces are lightly sanded before each run with 2/0 garnet paper and wiped clean of sanded particles with a cloth. The test block is placed on the leather strips on one end of an 18 inch long by 6 inch wide test panel adhered to a level surface and the load required to pull the block 7 inches across the panel at a speed of 20 inches per minute is recorded. Three runs on each test speciman are made and averaged. The dynamic coefficient of friction is the average load divided by the weight of the block.

Embossed polymer surfaces having a dynamic coefficient of friction less than 0.45 on dry leather are deemed too slippery for use as nonslip or friction-surface sheet material.

Copolymers suitable for use in the invention and having the properties described above include ethylenic copolymers (and terpolymers) such as prepared from ethylene and olefinically unsaturated monomers such as alkyl acrylates, propylene, vinyl acetate, butadiene, hexadienes, and combinations thereof. Commercially available forms of such copolymers include ethylene ethyl acrylate copolymers such as that sold under the trade designations "Bakelite DPD 6169" and "Bakelite DPD 6182", ethylene vinyl acetate such as that sold under the trade designations "Bakelite DQD 1868", "Bakelite DQD 6182", "Elvax 260" and "Ultrathene UE 645X", "Ultrathene 637", "Ultrathene 630-81" and "Ultrathene 631", and ethylene propylene diene terpolymers such as those sold under the trade designations "Nordel 1500", "TPR 1900" and "TPR 2000".

The copolymer comprising the upper surface of the friction-surface sheet of the invention may incorporate fillers or pigments to impart color or improve the physical properties in this layer. Such fillers, which include carbon black, clays, magnesium oxide, reclaimed rubber, fine scrap rubber particles, process oils, and other materials known in the art, can be used up to 70% by weight of the total weight of this layer. The fillers may be added to the copolymer prior to extruding it onto the backing film, by milling, mixing such as in a "Banbury" machine, and in other ways known in the art.

The copolymer layer will typically have an average thickness on the order of 10 to 60 mils, and when embossed, will typically have a thickness on the order of 3 to 25 mils or more at its thinnest portion (at the valleys).

The rubber prime coat, for promoting adhesion between a rubber base pressure-sensitive adhesive and the lower surface of the polyethylene terephthalate film, may be applied as a solution of natural rubber in an organic solvent such as heptane or trichloroethylene, typically on the order of 2 to 3% by weight rubber. This prime layer, which will be typically less than about 0.5 mil thick, can be eliminated and the rubber-base adhesive merely coated directly by conventional techniques upon the polyethylene terephthalate backing film surface, but priming provides a bond of superior strength between the backing film and the rubber base adhesive and, therefore, is preferred.

The rubber base adhesive most preferred for use on the friction-surface sheet material of the invention is a tacky, pressure-sensitive, abrasion-resistant, bakelized crude rubber adhesive. This type of adhesive is disclosed in U.S. Pat. Nos. 2,269,712, 2,410,079, and 2,177,627, each of which is incorporated herein by reference. Other normally tacky and pressure-sensitive adhesives which can be used include the tackified AB block copolymer adhesives disclosed in U.S. pat. application Ser. No. 146,473, filed May 21, 1971, now U.S. Pat. No. 3,787,531, by Carl A. Dahlquist and Vasant V. Kolpe, which application is incorporated herein by reference and acrylate adhesives disclosed in U.S. Pat. No. Re. 24,906, also incorporated by reference. The pressure-sensitive adhesive layer is preferably on the order of 2 to 10 mils in thickness.

The roll used to emboss the copolymer layer has a surface which is the counterpart of that desired for the friction-surface sheet material of the invention. The roll surface may be generated by engraving, rough sandblasting, or other ways which involve imparting a textured surface to a smooth cylindrical metal roll. The textured surface may have a uniform pattern, include indicia, or may be of random nature, as long as it embosses the desired textured surface into the sheet material.

One method of preparing an embossing roll suitable for use in the invention is by shaping an original which may be a prior art friction-surface sheet into a tubular form (with the textured surface forming the inner surface of the tube), supporting the tube in a temporary rigid tubular structure, sensitizing the textured surface so that metal can be electrically deposited thereon, and electrically depositing metal to build up a rigid structure suitable for use as an embossing roll. The temporary rigid structure and the original are then removed to reveal the embossing roll which can be supported for rotation. This method of producing an embossing roll is disclosed in U.S. Pat. No. 2,749,294.

The invention is further illustrated by reference to the following examples, in which all parts and percentages are by weight unless otherwise noted.

EXAMPLE 1

A 26 inch wide, 3 mil thick continuous sheet of biaxially oriented, heat-set polyethylene terephthalate (commercially available under the trade designation "Scotch Par" from the 3M Company) was primed by extruding a 1 mil thick layer of ethylene ethyl acrylate copolymer having a melt index of 6 (commercially available under the trade designation "Bakelite DFDA 6169" from the Union Carbide Company) thereon as a uniform layer. The extruder has barrel temperatures of 150°C, 200°C, 260°C, 280°C and 290°C, respectively, gate temperature of 290°C, die neck temperature of 290°C, die temperature of 290°C, and end plate temperatures of 290°C. The coating was permitted to cool and the coated polyethylene terephthalate film was passed, film side in, around a 6 ft. diameter hot can (130°C surface temperature) approximately 1 inch from 120 equally spaced type G 64T6 tubular ultra-violet lights arranged in 270° wrapped within a shroud around the hot can to provide an irradiation residence time of about 0.2 minute, with the coated side facing the ultra-violet lights. The polyethylene terephthalate film was then coated using a second extruder on the primed surface with a blend of (1) 94.5 parts ethylene ethyl acrylate copolymer consisting of 18% ethylacrylate and 82% ethylene (sold under the trade designation "Bakelite DFD 6169" by the Union Carbide Co.)

(2) 5 parts of a predispersed mixture of one titanium dioxide in one part low density polyethylene available under the trade designation "PMS 08500" (3) 0.2 part of a bacteriostat (sold under the trade designation "Vancide 89") and (4) 0.25 parts of a ultra-violet light absorber ("Cyasorb UV531") at an average thickness of 15 mils. The second extruder has barrel temperatures of 120°C, 140°C, 160°C and 165°C, respectively, a neck temperature of 145°C, and a die temperature of 155°–170°C. The coated film was then passed between an 8 inch diameter textured surface embossing roll and an 8 inch diameter rubber backup roll having a Shore A hardness value of 60–80 with the copolymer surface exposed to the embossing roll, providing an embossed textured surface ethylene ethyl acrylate copolymer layer. Since this film had a tendency to curl away from the polyethylene terephthalate side, it was decurled by passing between idler rolls over a decurling tension bar while under tension of about 400 pounds with the polyethylene terephthalate surface against the bar. The decurled laminate was roll coated on the remaining polyethylene terephthalate surface with a 2.8% natural rubber/heptane solution having a viscosity of about 150–200 cps. A very thin rubber coating (less than 0.5 mil in thickness) resulted, once the coating had been dried by passing it over a 68°C hot can. The rubber coating was irradiated from a distance of 1 inch with an ultra-violet light source consisting of 18 G 64T6 lamps arranged ¾ inches apart in a 2½ feet linear pattern with a residence time of 0.1 minute. Thereafter, a self-supporting, 4 mil thick, bakelized pressure-sensitive tacky adhesive composition prepared by mixing of equal parts of Part A and Part B described in the table below and sufficient heptane/ethanol (97/3) solution to make the viscosity 5000 cps, coating the mixture on a silicone oil coated paper release liner, and evaporating the solvent. The resultant adhesive layer was laminated to the rubber-primed side of the polyethylene terephthalate film by passing the superimposed layers between nip rolls consisting of an 11.5 inch diameter metal roll and 9.5 inch diameter rubber roll having a Shore A hardness of approximately 60 to 80 at a roll to roll pressure of 15 pounds per inch of width of contact.

| Rubber Base Pressure-Sensitive Adhesive | |
|---|---|
| Part A | |
| Ingredient | Parts by Weight |
| Crude rubber | 100.0 |
| Zinc oxide | 66.00 |
| Anhydrous lanolin | 6.75 |
| Natural pine rosin ("Nelio N Gum") | 6.75 |
| Oil-soluble heat-reactive para-substituted phenol aldehyde tackifier resin ("Bakelite CKR-1634") | 4.38 |
| Heptane | 226 |
| Denatured ethyl alcohol | 25 |
| Part B | |
| Ingredient | Parts by Weight |
| Pale crepe rubber | 100 |
| Polyterpene tackifier ("Piccolyte-S-115" resin) | 47.2 |
| Zinc resinate having a melting point of 164°C and acid number of zero ("Zirex Resin") | 9.42 |
| Tricresyl phosphate | 4.69 |
| 2,5-di-tert-amylhydroquinone antioxidant ("Santovar A") | 2.03 |

-Continued

| Rubber Base Pressure-Sensitive Adhesive | |
|---|---|
| Part B | |
| Ingredient | Parts by Weight |
| Oil-soluble heat-reactive para-substituted phenol aldehyde tackifier resin ("Bakelite CKR-1634") | 5.69 |
| Titanium dioxide | 3.86 |
| Carbon black | 0.08 |
| Cyclohexylamine | 0.02 |
| Denatured ethyl alcohol | 18.82 |
| Toluene | 18.82 |
| Heptane | 451 |

The resultant friction-surface sheet (less the release liner), which had a roughened surface, overall thickness of 30 mils and an average thickness of 23 mils, provided an excellent underfoot friction-surface when cut to size and applied to stairs, bath tubs and showers.

EXAMPLE 2

An embossed layer adherently bonded to polyethylene terephthalate backing film was prepared according to Example 1 and to such a structure was bonded 5 mils of a polystyrene polyisoprene AB block copolymer prepared according to Example 1 of aforementioned U.S. patent application Ser. No. 146,473. The A block was polystyrene having a molecular weight of 45,000 and the B block was polyisoprene having a molecular weight of 105,000. The adhesive was of the following ingredients:

| AB Block Copolymer Adhesive | |
|---|---|
| Ingredients | Parts |
| AB block copolymer | 100 |
| Petroleum resin tackifier ("Wingtack 95") | 25 |
| Antioxidant ("Irganox 1076") | 2 |
| Titanium dioxide | 0.5 |

EXAMPLE 3

A friction-surface sheet product was formed by adhering to the polyethylene terephthalate surface of embossed upper layer/backing film of Example 1 a pressure-sensitive adhesive containing the AB block copolymer described in Example 2 and multi-block copolymer (3 block copolymer) sold under the trade designation "Kraton 1108". The adhesive contained the following ingredients:

| AB/Multi-Block Copolymer Adhesive | |
|---|---|
| Ingredients | Parts |
| Multi-block copolymer ("Kraton 1108") | 23 |
| AB block copolymer | 77 |
| Petroleum resin tackifier ("Wingtack 95") | 35 |
| Antioxidant (*"Irganox 1076") | 2 |
| Titanium dioxide | 0.5 |

EXAMPLE 4

The friction-surface sheet material's adhesive was of a multi-block copolymer of the following ingredients:

| Multi-Block Copolymer Adhesive | |
|---|---|
| Ingredients | Parts |
| Multi-block copolymer ("Kraton 1108") | 100 |
| Polyterpene tackifier resin ("Piccolyte S-115") | 100 |
| Aliphatic process oil ("Sun Par 2280") | 10 |

EXAMPLE 5

The friction-surface sheet material's adhesive was a normally tacky and pressure-sensitive 10:90 acrylic acid:isooctyl arylate copolymer such as described in Example 7 of U.S. Pat. No. Re.24,906.

EXAMPLE 6

A friction-surface sheet material was prepared according to Example 1 except the upper surface polyethylene terephthalate prime coating was replaced by an ethyl vinyl acetate copolymer (sold under the trade designation "Bakelite DQDA 3737" by the Union Carbide Co.) For this material the extruder had barrel temperatures of 110°C, 130°C and 150°C, a neck temperature of 150°C, a die body temperature of 150°C and gate temperatures of 150°C.

EXAMPLE 7

The polyethylene terephthalate backing film was prepared by coextrusion with thermoplastic polyester ("Hytrel 4055") to form a 3 mil composite film having a 0.75 mil polyethylene terephthalate layer, after orientation and heatsetting. The polyester (Hytrel 4055) extruder had barrel temperatures about 140°C, 185°C, 190°C and 225°C, and a die temperature about 225°C. The composite was oriented at 80°C by stretching 2.8 times in the machine direction and 2.8 times in the transverse direction, and heat-set by heating at 190°C for 12 seconds.

The polyester (Hytrel 4055) surface was coated (without additional primer) with ethylene ethyl acrylate copolymer ("Bakelite DFDA 6169), embossed and bonded to an adhesive layer as described in Example 1.

EXAMPLE 8

A 2 mil thick polyethylene ("DFD 4947") prime coating was extrusion coated on 2 mil thick biaxially oriented, heat-set polyethylene terephthalate backing and irradiated according to Example 1. The polyethylene layer surface was overcoated with a mixture of 99 parts ethylene propylene diene terpolymer ("TPR-2000") and 1 part carbon black which was embossed to provide a 42 mil thick embossed laminate. The underside of the laminate (the polyethylene terephthalate surface) was primed with natural rubber as described in Example 1 and coated with a pressure-sensitive adhesive consisting of the ingredients designated Part B in Example 1.

EXAMPLE 9

A polyethylene terephthalate film primed on its upper surface as described in Example 1 was overcoated with ethylene vinyl acetate copolymer (sold under the trade designation "Ultrathene 645") and embossed as described in Example 1 to provide a friction-surface sheet.

EXAMPLE 10

The embossable copolymer upper layer was a mixture of (1) 20 parts ethylene vinyl acetate copolymer ("Elvax 260") (2) 20 parts powdered polyethylene ("Microthene 715") and (3) 60 parts shredded scrap rubber tire filler (screened through "Tyler" 12 mesh screen having about 1.41 mm openings). The scrap rubber was a filler which did not undesirably increase the hardness. The copolymer was ground to a powder and mixed with the polyethylene and filler in a two stage polyethylene extruder having barrel temperatures of 140°C, 190°C, 200°C and 205°C, a neck temperature of 205°C and a die temperature of 200°–210°C. The copolymer was coated on a primed polyethylene terephthalate film prepared according to Example 1 and embossed to produce a friction-surface sheet.

What is claimed is:

1. Friction-surface sheet material especially useful for providing a safe frictional walk-on surface for stairs, in bath tubs and showers, and on other surfaces which may be inherently undesirably slippery, comprising in combination:

a heat-set, biaxially oriented, polyethylene terephthalate backing having a thickness of about 1 to about 5 mils, an ultraviolet light transmissive ethylene polymer prime layer, adherently bonded to one major surface of said polyethylene terephthalate backing, adherently bonded to the primed surface of said backing a layer of embossed, textured, tough, scuff-resistant, weather-resistant, flexible ethylenic copolymer material having a Shore A durometer hardness value within the range of about 60–95, said layer being resistant to permanent deformation at temperatures below 90°C, having a tensile strength of at least 700 psi, a dynamic co-efficient of friction greater than 0.45 and an elongation of at least 100%; and about 2 to about 10 mils of normally tacky and pressure-sensitive adhesive uniformly coated over and adherently bonded to the opposite major surface of said backing.

2. The friction-surface sheet material of claim 1 wherein said ethylenic copolymer is an ethylenic copolymer or terpolymer formed from ethylene and olefinically unsaturated monomers selected from the group consisting of alkyl acrylates, propylene, vinyl acetate, butadiene, hexadienes, and combinations thereof.

3. The friction-surface sheet material of claim 1 including a natural rubber prime layer interposed between said polyethylene terephthalate layer and said adhesive layer, and wherein said adhesive is a rubber base adhesive.

4. The friction-surface sheet material of claim 1 wherein said ethylenic copolymer layer is formed of ethylene acrylate copolymer.

5. The friction-surface sheet material of claim 1 wherein said adhesive is selected from the group consisting of acrylate adhesives and AB block copolymer adhesives.

6. The friction-surface sheet material of claim 5 wherein said AB block copolymer adhesive also contains multi-block copolymer having at least 3 connected polymer blocks.

* * * * *

UNITED STATES PATENT OFFICE
CERTIFICATE OF CORRECTION

PATENT NO. : 3,895,153
DATED : July 15, 1975
INVENTOR(S) : Manley R. Johnston and Roger P. Goeppinger It is certified that error appears in the above—identified patent and that said Letters Patent are hereby corrected as shown below:

Col. 1, line 12, change "25,788" to --25,778--

Col. 7, line 1, change "one titanium" to --one part titanium--

Col. 9, line 15, change "arylate" to --acrylate--

Claim 4, line 3, after "ethylene" and before "acrylate",

--ethyl-- should be inserted.

Signed and Sealed this fourteenth Day of October 1975

[SEAL]

Attest:

RUTH C. MASON
*Attesting Officer*

C. MARSHALL DANN
*Commissioner of Patents and Trademarks*